(12) United States Patent
Mondello et al.

(10) Patent No.: US 10,715,321 B2
(45) Date of Patent: Jul. 14, 2020

(54) PHYSICAL UNCLONABLE FUNCTION USING MESSAGE AUTHENTICATION CODE

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

(*) Notice: Subject to any disclaimer, the term of this patent is extended or adjusted under 35 U.S.C. 154(b) by 158 days.

(21) Appl. No.: 15/853,498

(22) Filed: Dec. 22, 2017

(65) Prior Publication Data

US 2019/0199525 A1 Jun. 27, 2019

(51) Int. Cl.
*H04L 9/08* (2006.01)
*H04L 9/32* (2006.01)

(52) U.S. Cl.
CPC .......... *H04L 9/0866* (2013.01); *H04L 9/3242* (2013.01); *H04L 9/3278* (2013.01)

(58) Field of Classification Search
CPC .... H04L 9/0866; H04L 9/3242; H04L 9/3278
See application file for complete search history.

(56) References Cited

U.S. PATENT DOCUMENTS

| | | | |
|---|---|---|---|
| 7,934,049 B2 | 4/2011 | Holtzman et al. | |
| 8,068,614 B2 | 11/2011 | Kumar et al. | |
| 9,049,005 B2 | 6/2015 | Cho et al. | |
| 9,489,540 B2 | 11/2016 | Lee et al. | |
| 9,563,774 B1 | 2/2017 | Litvin | |
| 9,858,208 B2 | 1/2018 | Connolly et al. | |
| 2003/0033175 A1 | 2/2003 | Ogura et al. | |
| 2004/0249663 A1 | 12/2004 | Shishido | |
| 2007/0300207 A1 | 12/2007 | Booth et al. | |
| 2008/0148061 A1 | 6/2008 | Jin et al. | |
| 2009/0222672 A1* | 9/2009 | Clarke | G06F 21/31 713/189 |
| 2010/0228997 A1 | 9/2010 | Cheng et al. | |
| 2010/0241841 A1 | 9/2010 | Buer | |
| 2010/0313056 A1 | 12/2010 | Margolis et al. | |
| 2011/0191837 A1* | 8/2011 | Guajardo Merchan | G06F 21/32 726/6 |

(Continued)

OTHER PUBLICATIONS

International Search Report and Written Opinion, PCT/US2019/028303, dated Aug. 6, 2019.

(Continued)

*Primary Examiner* — Saleh Najjar
*Assistant Examiner* — Devin E Almeida
(74) *Attorney, Agent, or Firm* — Greenberg Traurig (57) ABSTRACT

An improved PUF architecture for generating physical unclonable function (PUF) values. The PUF architecture generates an output by feeding inputs provided from one or more PUFs into a message authentication code (MAC) block. The output from the MAC block provides the improved PUF value (e.g., resistant to the preimage hacker attack). The PUFs can be selected by a selector module. An additional input to the MAC block that is used to output a PUF value may be obtained from a monotonic counter that is, for example, incremented prior to each PUF output calculation. In one embodiment, a capability is provided to generate a session key by using a monotonic counter or other freshness mechanism like timestamp, NONCE, etc.

16 Claims, 5 Drawing Sheets

(56) References Cited

U.S. PATENT DOCUMENTS

| | | |
|---|---|---|
| 2013/0047144 A1 | 2/2013 | Chalmers et al. |
| 2013/0185548 A1 | 7/2013 | Djabarov et al. |
| 2013/0279689 A1 | 10/2013 | Obaidi |
| 2014/0032933 A1* | 1/2014 | Smith ................. G06F 21/6209 713/193 |
| 2014/0108786 A1 | 4/2014 | Kreft |
| 2015/0012737 A1 | 1/2015 | Newell |
| 2015/0038090 A1 | 2/2015 | Chang |
| 2015/0092939 A1* | 4/2015 | Gotze ....................... H04L 9/34 380/2 |
| 2015/0348179 A1 | 12/2015 | Kamisawa |
| 2016/0055068 A1 | 2/2016 | Jeansonne et al. |
| 2016/0128016 A1 | 5/2016 | Avary et al. |
| 2016/0357963 A1 | 12/2016 | Sherman |
| 2017/0017808 A1 | 1/2017 | Kwong et al. |
| 2017/0109533 A1 | 4/2017 | Shah et al. |
| 2017/0126414 A1* | 5/2017 | Goel ..................... G06F 3/0622 |
| 2018/0373598 A1 | 12/2018 | Mondello et al. |
| 2019/0202399 A1 | 7/2019 | Troia et al. |
| 2019/0221139 A1* | 7/2019 | Schrijen .................. G06F 3/062 |
| 2019/0229913 A1 | 7/2019 | Fava et al. |
| 2019/0334882 A1 | 10/2019 | Mondello et al. |
| 2019/0372964 A1 | 12/2019 | Newton et al. |

OTHER PUBLICATIONS

Emmanuel Owusu, et al.: "OASIS: on achieving a sanctuary for integrity and secrecy on untrusted platforms", CCS'13 Proceedings of the 2013 ACM SIGSAC conference on Computer & communications security, Nov. 8, 2013. See sections 4, 6.2.

International Search Report and Written Opinion, PCT/US2018/063143, dated Mar. 12, 2019.

International Search Report and Written Opinion, PCT/US2018/068132, dated May 1, 2019.

International Search Report and Written Opinion, PCT/US2018/063641, dated Jun. 27, 2019.

* cited by examiner

PHYSICAL UNCLONABLE FUNCTION USING MESSAGE AUTHENTICATION CODE

FIELD OF THE TECHNOLOGY

At least some embodiments disclosed herein relate to physical unclonable functions (PUFs) in general and more particularly, but not limited to generating an output from a message authentication code (MAC) using input(s) provided by one or more PUFs. In some embodiments the input(s) can be additionally, or alternatively, provided by a freshness mechanism (e.g., monotonic counter, NONCE, timestamp, etc.).

BACKGROUND

A physical unclonable function (PUF) provides, for example, a digital value that can serve as a unique identity for a semiconductor device, such as a microprocessor. PUFs are based, for example, on physical variations which occur naturally during semiconductor manufacturing, and which permit differentiating between otherwise identical semiconductor chips.

PUFs are typically used in cryptography. A PUF can be, for example, a physical entity that is embodied in a physical structure. PUFs are often implemented in integrated circuits, and are typically used in applications with high security requirements. For example, PUFs can be used as a unique and untamperable device identifier. PUFs can also be used for secure key generation, and as a source of randomness.

BRIEF DESCRIPTION OF THE DRAWINGS

The embodiments are illustrated by way of example and not limitation in the figures of the accompanying drawings in which like references indicate similar elements.

DETAILED DESCRIPTION

At least some embodiments disclosed herein provide an improved architecture for generating physical unclonable function (PUF) values. In general, the architecture generates an output by feeding inputs provided from one or more PUFs into a message authentication code (MAC). The output from the MAC provides the improved PUF.

In general, semiconductor chip manufacturers face the problem of key injection, which is the programming of a unique secret key for each chip or die, for example, provided from a semiconductor wafer. It is desired that key injection be performed in a secure environment to avoid leaking or disclosing the secret keys injected into the chips. It is also desired to ensure that the key cannot be hacked or read back after production of the chip. In some cases, for example, key injection procedures are certified or executed by a third-party infrastructure.

Chip manufacturers desire to reduce the production cost of chips that include cryptographic capabilities. Chip manufacturers also desire to simplify production flows while maintaining a consistent level of security performance of the manufactured chips. However, key injection is one of the more expensive production steps.

Chip manufacturers also face the problem of improving the uniformity of PUFs when used as pseudo-random number generators. In some cases, this problem may include a cross-correlation between dice because of the phenomena on which a seed value provided by the PUF is based.

A PUF is based on unpredictable physical phenomena such as, for example, on-chip parasitic effect, on-chip path delays, etc., which are unique for each die. These phenomena are used, for example, to provide a seed value for a pseudo-random number generator.

Two different chips selected in the production line must have different PUF values. The PUF value generated in each chip must not change during the life of the device. If two chips have similar keys (e.g., there is a low Hamming distance between them), it may be possible to use a key of one chip to guess the key of another chip (e.g., preimage hacker attack).

Using the improved PUF architecture described below can provide a solution to one or more of the above problems by providing output values suitable for providing the function of a PUF on each chip or die. The improved PUF architecture below uses a PUF, which enables each chip or die to automatically generate a unique secure key at each power-up of the chip or die. The secure key does not need to be stored in a non-volatile memory, which might be hacked or otherwise compromised.

The improved PUF architecture further uses a MAC to generate the improved PUF output (e.g., a unique key) for use by, for example, cryptographic functions or processes that are integrated into the semiconductor chip. The use of the MAC can, for example, increase the Hamming distance between keys generated on different chips.

In at least some embodiments disclosed herein, an improved PUF architecture using the output from a MAC is provided as a way to generate seed or other values. Thus, the improved PUF architecture provides, for example, a way to perform key injection that reduces cost of manufacture, and that improves reliability and/or uniformity of PUF operation on the final chip.

In one embodiment, a method includes: providing, by at least one PUF, at least one value; and generating, based on a MAC, a first output, wherein the MAC uses the at least one value provided by the at least one PUF as an input for generating the first output.

In one embodiment, a system includes: at least one PUF device; a message authentication code MAC module configured to receive a first input based on at least one value provided by the at least one PUF device; at least one processor; and memory containing instructions configured to instruct the at least one processor to generate, based on the first input, a first output from the MAC module. In various embodiments, the MAC module can be implemented using hardware and/or software.

In one embodiment, the system further includes a selector module that is used to select one or more of the PUF devices for use in providing values to the MAC module. For example, values provided from several PUF devices can be linked and provided as an input to the MAC module. In various embodiments, the selector module can be implemented using hardware and/or software.

Figure 1:
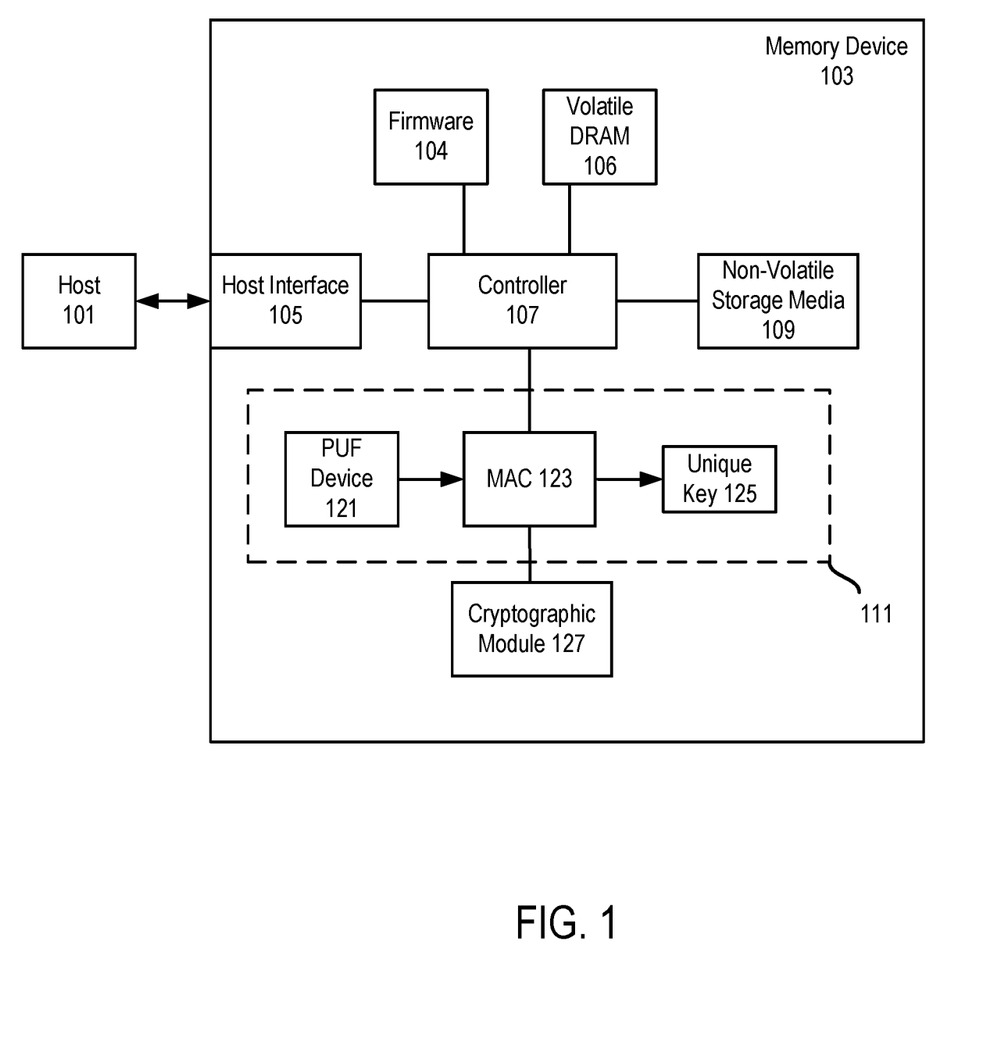
FIG. 1 shows a system for generating a unique key from an output of a message authentication code (MAC) that receives an input from a physical unclonable function (PUF) device, according to one embodiment.

FIG. 1 shows a system that provides a PUF architecture 111 used to generate a unique key 125 (or other value) from an output of a message authentication code (MAC) module 123, according to one embodiment. The MAC module 123 receives an input value obtained from a physical unclonable function (PUF) device 121.

The PUF device 121 in FIG. 1 can be, for example, any one of various different, known types of PUFs. The MAC module 123 provides, for example, a one-way function such as SHA1, SHA2, MD5, CRC, TIGER, etc.

The architecture 111 can, for example, improve the Hamming distance of the PUF values or codes generated between chips. The MAC functions are unpredictable (e.g., input sequences with just a single bit difference provided to the MAC function provide two completely different output results). Thus, the input to MAC function cannot be recognized or determined when having only knowledge of the output. The architecture 111 also can, for example, improve the uniformity of the PUF as a pseudo-random number generator.

In one example, the value generated by the PUF architecture 111 (e.g., unique key 125 or another value) may be a number having N bits, where N depends on a cryptographic algorithm implemented on a chip (e.g., memory device 103 or another device) that includes the PUF architecture 111. In one example, the chip implements a cryptographic function that uses HMAC-SHA256, in which case the output from MAC module 123 has a size N of 256 bits. The use of the output from the MAC module 123 provides a message length for the output value that is suitable for use as a key (without needing further compression or padding).

The PUF architecture 111 is implemented in a device such as the illustrated memory device 103, or can be implemented in other types of computing devices such as, for example, integrated circuits implemented in a number of semiconductor chips provided by a wafer manufacturing production line.

In one embodiment, the MAC module 123 cooperates with and/or is integrated into or as part of cryptographic module 127, for example which can provide cryptographic functions for memory device 103. For example, the output of the MAC module 123 can be suitable to be used as a key due to the MAC being used by the memory device 103 for other cryptographic purposes.

The operation of the PUF architecture 111, the cryptographic module 127, and/or other functions of the memory device 103 can be controlled by a controller 107. The controller 107 can include, for example, one or more microprocessors.

In FIG. 1, a host 101 can communicate with the memory device 103 via a communication channel. The host 101 can be a computer having one or more Central Processing Units (CPUs) to which computer peripheral devices, such as the memory device 103, may be attached via an interconnect, such as a computer bus (e.g., Peripheral Component Interconnect (PCI), PCI eXtended (PCI-X), PCI Express (PCIe)), a communication portion, and/or a computer network.

The memory device 103 can be used to store data for the host 101, for example, in the non-volatile storage media 109. Examples of memory devices in general include hard disk drives (HDDs), solid state drives (SSDs), flash memory, dynamic random-access memory, magnetic tapes, network attached storage device, etc. The memory device 103 has a host interface 105 that implements communications with the host 101 using the communication channel. For example, the communication channel between the host 101 and the memory device 103 is a Peripheral Component Interconnect Express (PCI Express or PCIe) bus in one embodiment; and the host 101 and the memory device 103 communicate with each other using NVMe protocol (Non-Volatile Memory Host Controller Interface Specification (NVMHCI), also known as NVM Express (NVMe)).

In some implementations, the communication channel between the host 101 and the memory device 103 includes a computer network, such as a local area network, a wireless local area network, a wireless personal area network, a cellular communications network, a broadband high-speed always-connected wireless communication connection (e.g., a current or future generation of mobile network link); and the host 101 and the memory device 103 can be configured to communicate with each other using data storage management and usage commands similar to those in NVMe protocol.

The controller 107 can run firmware 104 to perform operations responsive to the communications from the host 101, and/or other operations. Firmware in general is a type of computer program that provides control, monitoring and data manipulation of engineered computing devices. In FIG. 1, the firmware 104 controls the operations of the controller 107 in operating the memory device 103, such as the operation of the PUF architecture 111, as further discussed below.

The memory device 103 has non-volatile storage media 109, such as magnetic material coated on rigid disks, and/or memory cells in an integrated circuit. The storage media 109 is non-volatile in that no power is required to maintain the data/information stored in the non-volatile storage media 109, which data/information can be retrieved after the non-volatile storage media 109 is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media 109 is non-volatile and can retain data stored therein without power for days, months, and/or years.

The memory device 103 includes volatile Dynamic Random-Access Memory (DRAM) 106 for the storage of run-time data and instructions used by the controller 107 to improve the computation performance of the controller 107 and/or provide buffers for data transferred between the host 101 and the non-volatile storage media 109. DRAM 106 is volatile in that it requires power to maintain the data/information stored therein, which data/information is lost immediately or rapidly when the power is interrupted.

Volatile DRAM 106 typically has less latency than non-volatile storage media 109, but loses its data quickly when power is removed. Thus, it is advantageous to use the volatile DRAM 106 to temporarily store instructions and data used for the controller 107 in its current computing task to improve performance. In some instances, the volatile DRAM 106 is replaced with volatile Static Random-Access Memory (SRAM) that uses less power than DRAM in some applications. When the non-volatile storage media 109 has data access performance (e.g., in latency, read/write speed) comparable to volatile DRAM 106, the volatile DRAM 106 can be eliminated; and the controller 107 can perform computing by operating on the non-volatile storage media 109 for instructions and data instead of operating on the volatile DRAM 106.

For example, cross point storage and memory devices (e.g., 3D XPoint memory) have data access performance comparable to volatile DRAM 106. A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller 107 has in-processor cache memory with data access performance that is better than the volatile DRAM 106 and/or the non-volatile storage media 109. Thus, it is preferred to cache parts of instructions and data used in the current computing task in the in-processor cache memory of the controller 107 during the computing operations of the controller 107. In some instances, the controller 107 has multiple processors, each having its own in-processor cache memory.

Optionally, the controller 107 performs data intensive, in-memory processing using data and/or instructions organized in the memory device 103. For example, in response to a request from the host 101, the controller 107 performs a real-time analysis of a set of data stored in the memory device 103 and communicates a reduced data set to the host 101 as a response. For example, in some applications, the memory device 103 is connected to real-time sensors to store sensor inputs; and the processors of the controller 107 are configured to perform machine learning and/or pattern recognition based on the sensor inputs to support an artificial intelligence (AI) system that is implemented at least in part via the memory device 103 and/or the host 101.

In some implementations, the processors of the controller 107 are integrated with memory (e.g., 106 or 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The memory device 103 can be used in various computing systems, such as a cloud computing system, an edge computing system, a fog computing system, and/or a standalone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments disclosed herein can be implemented using computer instructions executed by the controller 107, such as the firmware 104. In some instances, hardware circuits can be used to implement at least some of the functions of the firmware 104. The firmware 104 can be initially stored in the non-volatile storage media 109, or another non-volatile device, and loaded into the volatile DRAM 106 and/or the in-processor cache memory for execution by the controller 107.

For example, the firmware 104 can be configured to use the techniques discussed below in operating the PUF architecture. However, the techniques discussed below are not limited to being used in the computer system of FIG. 1 and/or the examples discussed above.

In some implementations, the output of the MAC module 123 can be used to provide, for example, a root key or a seed value. In other implementations, the output can be used to generate one or more session keys.

In one embodiment, the output from the MAC module 123 can be transmitted to another computing device. For example, the unique key 125 can be transmitted via host interface 105 to host 101.

Figure 2:
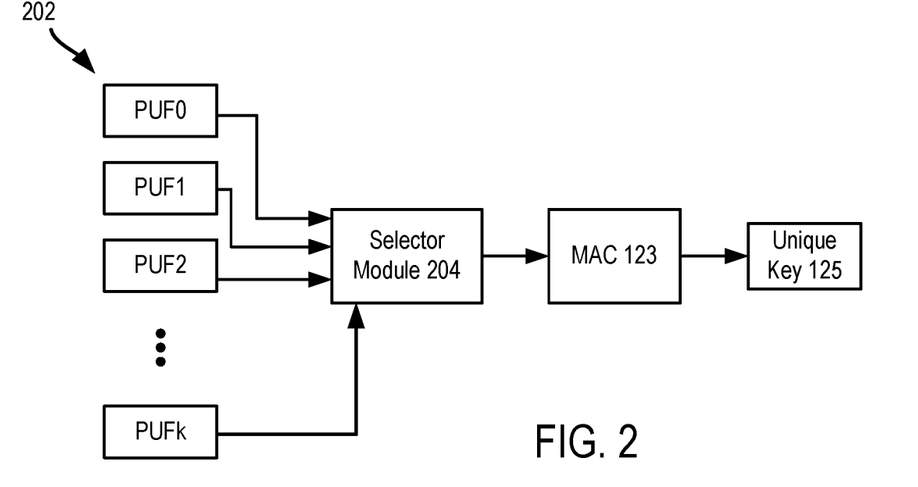
FIG. 2 shows a system for generating a unique key from an output of a MAC that receives inputs from one or more PUF devices selected by a selector module, according to one embodiment.

FIG. 2 shows a system for generating the unique key 125 from an output of the MAC module 123 using a PUF architecture similar to architecture 111 of FIG. 1, but including multiple PUF devices 202 and a selector module 204, according to one embodiment. The MAC module 123 receives inputs from one or more PUF devices 202 selected by the selector module 204. In one example, PUF devices 202 include PUF device 121.

The PUF devices 202 can be, for example, identical or different (e.g., based on different random physical phenomena). In one embodiment, selector module 204 acts as an intelligent PUF selection block or circuit to select one or more of PUF devices 202 from which to obtain values to provide as inputs to the MAC module 123.

In one embodiment, the selector module 204 bases the selection of the PUF devices 202 at least in part on results from testing the PUF devices 202. For example, the selector module 204 can test the repeatability of each PUF device 202. If any PUF device 202 fails testing, then the selector module 204 excludes the failing device from providing an input value to the MAC module 123. In one example, the failing device can be excluded temporarily or indefinitely.

In some implementations, the selector module 204 permits testing the PUF functionality of each chip during production and/or during use in the field (e.g., by checking the repeatability of the value provided by each PUF device 202). If two or more values provided by a given PUF device are different, then the PUF device is determined to be failing and is excluded from use as an input to the MAC module 123.

In one embodiment, the selector module 204 is used to concurrently use multiple PUF devices 202 as sources for calculating an improved PUF output from the MAC module 123. For example, the selector module 204 can link a value from a first PUF device with a value from a second PUF device to provide as an input to the MAC module 123. In some implementations, this architecture permits obtaining a robust PUF output due to its dependence on several different physical phenomena.

Figure 3:
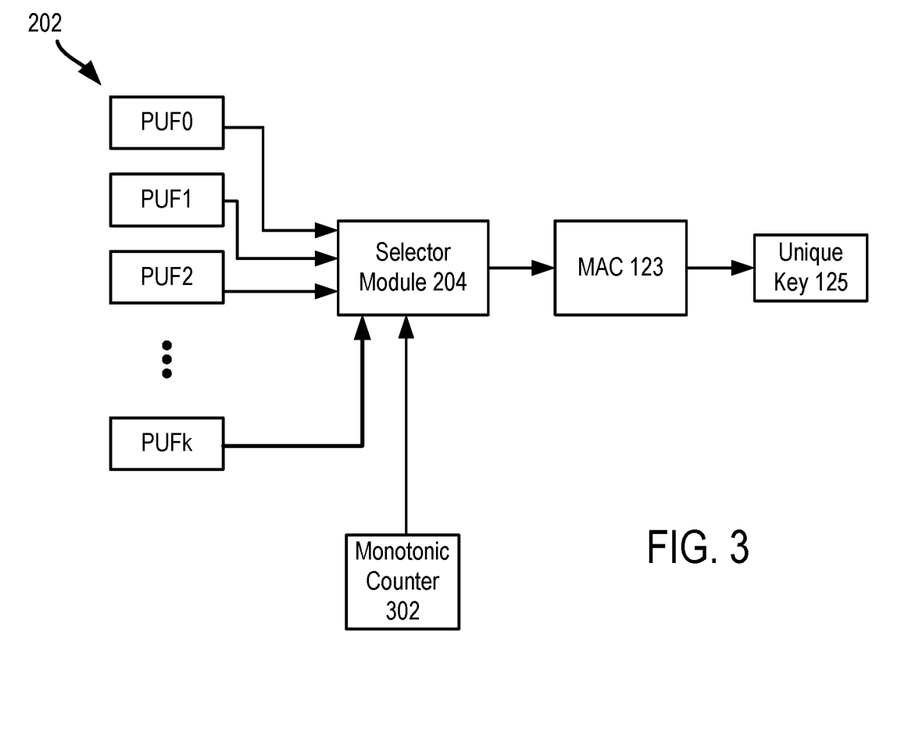
FIG. 3 shows a system for generating a unique key from an output of a MAC that receives inputs from one or more PUF devices and an input from a monotonic counter (and/or an input from another freshness mechanism like NONCE, time-stamp, etc.), according to one embodiment.

FIG. 3 shows a system for generating the unique key 125 from an output of the MAC module 123, according to one embodiment. The PUF architecture illustrated in FIG. 3 is similar to the PUF architecture illustrated in FIG. 2, except that a monotonic counter 302 is included to provide values to selector module 204. In various embodiments, the monotonic counter 302 can be implemented using hardware and/or software.

The MAC module 123 receives inputs from one or more PUF devices 202 and an input from the monotonic counter 302. In one example, values obtained from the PUF devices 202 and the monotonic counter 302 are linked and then provided as an input to the MAC module 123. In some implementations, the monotonic counter 302 is a non-volatile counter that only increments its value when requested. In some embodiments, the monotonic counter 302 is incremented after each power-up cycle of a chip.

In some implementations, the PUF architecture of FIG. 3 can be used to provide a way to securely share keys between a semiconductor chip and other components in an application, such as for example a public key mechanism.

In some implementations, the monotonic counter 302 is incremented before each calculation of a PUF, which ensures that the input of the MAC module 123 is different at each cycle, and thus the output (and/or pattern of output) provided is different. In some examples, this approach can be used to generate a session key, where each session key is different.

In some embodiments, the selector module 204 can selectively include or exclude the monotonic counter 302 (or other freshness mechanism like NONCE, timestamp) from providing a counter value as an input to the MAC module 123.

In some embodiments, the monotonic counter 302 is also used by cryptographic module 127. In some embodiments, a PUF architecture that includes the monotonic counter can be used as a session key generator to guarantee a different key at each cycle. In some implementations, the generated session key is protected in this way: Session key=MAC [one or more PUFs|MTC or other freshness]

In other embodiments, a mechanism is used as follows:

$$\text{Session key}=\text{MAC}_{key\_based}[\text{Root\_Key},\text{MTC or other freshness mechanism}]$$

Where: Root_Key=an output value provided from the MAC module 123 above, or any other kind of key that is present on the chip.

The $\text{MAC}_{key\_based}$ function above is, for example, a MAC algorithm based on a secret key. For example, there can be two types of MAC algorithm in cryptography:
1. An algorithm based on a secret key like, for example, HMAC family (HMAC-SHA256 is key based).
2. An algorithm that is not based on a secret key, for example like SHA256 (SHA stand-alone is not key based).

It should be noted that a MAC that is key-based can be transformed in a MAC that is not key-based by setting the key to a known value (e.g. 0x000 . . . 0xFFFF etc. . . . ).

Figure 5:
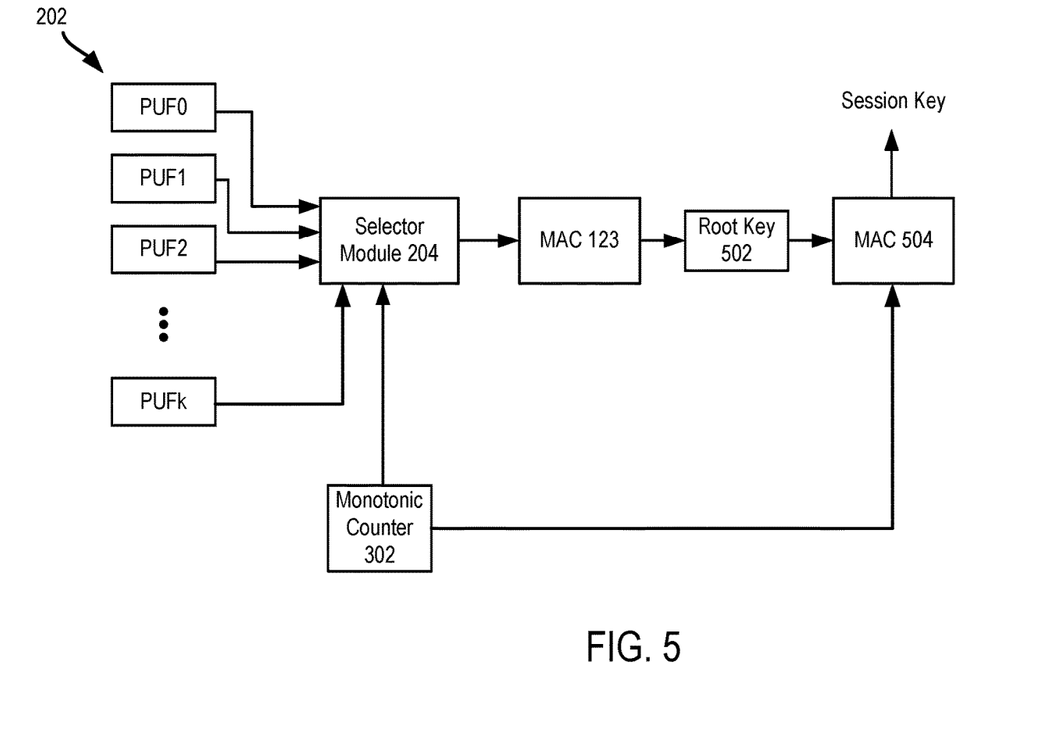
FIG. 5 shows a system for generating a root key from an output of a MAC that receives inputs from one or more PUF devices and an input from a monotonic counter (and/or an input from another freshness mechanism like NONCE, time-stamp, etc.), and that adds an additional MAC to generate a session key, according to one embodiment.

FIG. 5 shows a system for generating a root key from an output of a MAC that receives inputs from one or more PUF devices 202 and an input from a monotonic counter 302 (and/or an input from another freshness mechanism like NONCE, time-stamp, etc.), and that adds an additional MAC module 504 to generate a session key using a root key input, according to one embodiment. In this embodiment, MAC module 123 provides root key 502 as the output from MAC module 123. Root key 502 is an input to the MAC module 504, which can use a MAC function such as Session key=$\text{MAC}_{key\_based}$ [Root_Key, MTC or other freshness mechanism], which was described above. The root key input in this key-based function can be root key 502, as illustrated.

Additionally, in one embodiment, monotonic counter 302 can provide an input to the MAC module 504. In other embodiments, a different monotonic counter or other value from the chip can be provided as an input to MAC module 504 instead of using monotonic counter 302. In some cases, the monotonic counter 302 provides a counter value to MAC module 504, but not to selector module 204. In other cases, the counter value can be provided to both MAC modules, or excluded from both modules.

Figure 4:
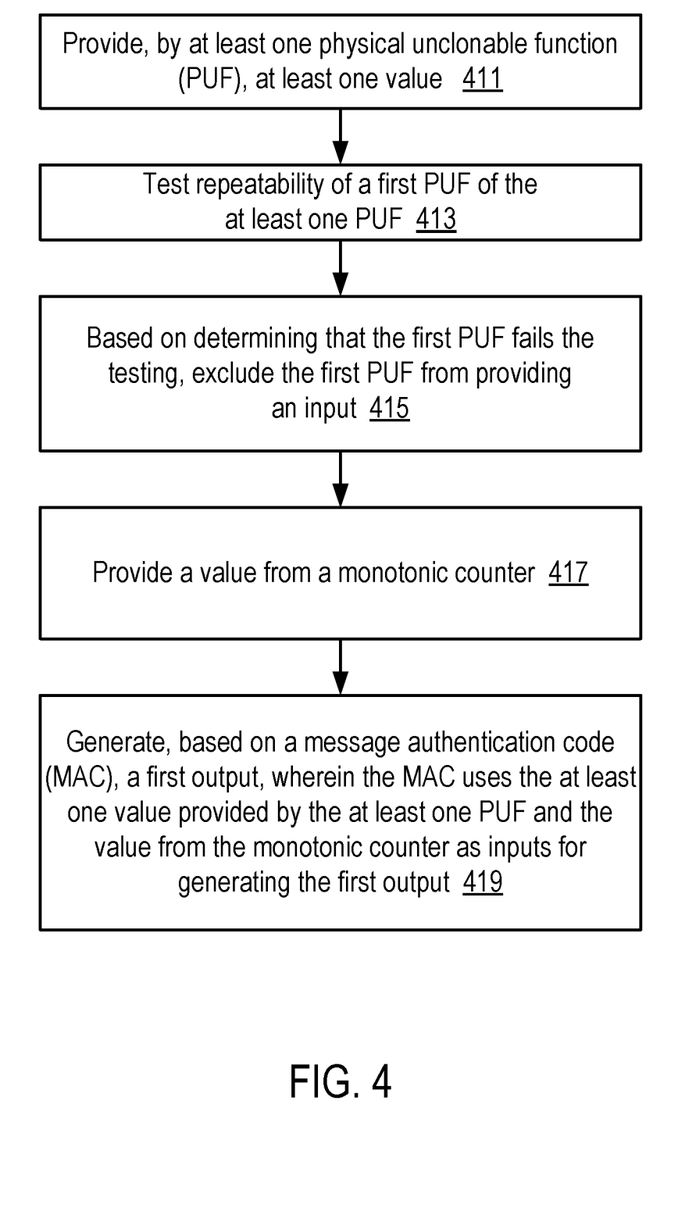
FIG. 4 shows a method to generate an output from a MAC that uses one or more input values provided from one or more PUFs, according to one embodiment.

FIG. 4 shows a method to generate an output from a MAC that uses one or more input values provided from one or more PUFs, according to one embodiment. For example, the method of FIG. 4 can be implemented in the memory device 103 of FIG. 1.

The method of FIG. 4 includes, at block 411, providing one or more values by at least one PUF (e.g., providing values from one or more of PUF devices 202).

At block 413, repeatability of one or more of the PUFs can be tested, for example as was described above. This testing is optional.

At block 415, if testing has been performed at block 413, and it has been determined that a PUF device fails the testing, then the failing PUF device is excluded from providing an input to the MAC. This excluding may be performed, for example, by selector module 204, as was discussed above.

At block 417, a value is provided from a monotonic counter (e.g., monotonic counter 302). The use of the monotonic counter in the PUF architecture is optional.

At block 419, an output is generated from the MAC, which uses one or more values provided by the PUFs (and optionally at least one value from the monotonic counter) as inputs to the MAC.

Various other embodiments are now described below for a method implemented in a computing device that includes: providing, by at least one physical unclonable function (PUF), at least one value; and generating, based on a message authentication code (MAC), a first output, wherein the MAC uses the at least one value provided by the at least one PUF as an input for generating the first output.

In one embodiment, the computing device is a first computing device, and the method further comprises transmitting the first output to a second computing device, wherein the first output is a unique identifier of the first computing device.

In one embodiment, providing the at least one value comprises selecting a first value from a first PUF and selecting a second value from a second PUF.

In one embodiment, the method further comprises: providing a value from a monotonic counter; wherein generating the first output further comprises using the value from the monotonic counter as an additional input to the MAC for generating the first output.

In one embodiment, the method further comprises: generating a plurality of session keys based on respective outputs provided by the MAC, wherein the monotonic counter provides values used as inputs to the MAC; and incrementing the monotonic counter after generating each of the session keys.

In one embodiment, the method further comprises: testing repeatability of a first PUF of the at least one PUF; and based on determining that the first PUF fails the testing, excluding the first PUF from providing any input to the MAC when generating the first output.

In one embodiment, the testing comprises comparing two or more values provided by the first PUF.

In one embodiment, the computing device is a memory device, and the memory device comprises a non-volatile storage media configured to store an output value generated using the MAC.

In one embodiment, the method further comprises performing, by at least one processor, at least one cryptographic function, wherein performing the at least one cryptographic function comprises using an output value generated using the MAC.

In one embodiment, a non-transitory computer storage medium stores instructions which, when executed on a memory device (e.g., the memory device 103), cause the memory device to perform a method, the method comprising: providing, by at least one physical unclonable function (PUF), at least one value; and generating, based on a message authentication code (MAC), a first output, wherein the MAC uses the at least one value provided by the at least one PUF as an input for generating the first output.

In various other embodiments described below, the method of FIG. 4 can be performed on a system that includes: at least one physical unclonable function (PUF) device; a message authentication code (MAC) module configured to receive a first input based on at least one value provided by the at least one PUF device; at least one processor; and memory containing instructions configured to instruct the at least one processor to generate, based on the first input, a first output from the MAC module.

In one embodiment, the MAC module includes a circuit. In one embodiment, the first output from the MAC module is a key that identifies a die. In one embodiment, the first output from the MAC module is a root key, and the instructions are further configured to instruct the at least one processor to generate a session key using an output from the MAC module.

In one embodiment, the system is part of a semiconductor chip (e.g., one chip of several chips obtained from a semiconductor wafer), the first output from the MAC module is a unique value that identifies the chip, and the instructions are further configured to instruct the at least one processor to transmit the unique value to a computing device.

In one embodiment, the at least one PUF device comprises a plurality of PUF devices (e.g., PUF devices 202), and the system further comprises a selector module configured to select the at least one PUF device that provides the at least one value.

In one embodiment, the selector module is further configured to generate the first input for the MAC module by linking a first value from a first PUF device and a second value from a second PUF device.

In one embodiment, the system further comprises a monotonic counter configured to provide a counter value, and the instructions are further configured to instruct the at least one processor to generate the first input by linking the counter value with the at least one value provided by the at least one PUF device.

In one embodiment, the system further comprises a selector module configured to select the at least one PUF device that provides the at least one value, wherein linking the counter value with the at least one value provided by the at least one PUF device is performed by the selector module.

In one embodiment, the monotonic counter is further configured to increment, after generating the first input, the counter value to provide an incremented value; and the instructions are further configured to instruct the at least one processor to generate, based on the incremented value and at least one new value provided by the at least one PUF device, a second output from the MAC module.

A non-transitory computer storage medium can be used to store instructions of the firmware 104. When the instructions are executed by the controller 107 of the memory device 103, the instructions cause the controller 107 to perform any of the methods discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully-functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
   at least one physical unclonable function (PUF) device;
   a message authentication code (MAC) module configured to receive a first input based on at least one value provided by the at least one PUF device;
   a monotonic counter configured to provide a counter value;
   at least one processor; and
   memory containing instructions configured to instruct the at least one processor to:
      generate, based on the first input, a first output from the MAC module, wherein generating the first output comprises linking the counter value with the at least one value provided by the at least one PUF device;
      after generating the first output, increment the counter value to provide an incremented value; and
      generate, based on the incremented value and at least one new value provided by the at least one PUF device, a second output from the MAC module.

2. The system of claim 1, wherein the MAC module comprises a circuit.

3. The system of claim 1, wherein the first output from the MAC module is a key that identifies a die.

4. The system of claim 1, wherein the first output from the MAC module is a root key, and wherein the instructions are further configured to instruct the at least one processor to generate a session key using an output from the MAC module.

5. The system of claim 1, wherein the system is part of a semiconductor chip, the first output from the MAC module is a unique value that identifies the chip, and the instructions are further configured to instruct the at least one processor to transmit the unique value to a computing device.

6. The system of claim 1, wherein the at least one PUF device comprises a plurality of PUF devices, and the system further comprising a selector module configured to select the at least one PUF device that provides the at least one value.

7. The system of claim 6, wherein the selector module is further configured to generate the first input for the MAC module by linking a first value from a first PUF device and a second value from a second PUF device.

8. The system of claim 1, further comprising a selector module configured to select the at least one PUF device that provides the at least one value, wherein linking the counter value with the at least one value provided by the at least one PUF device is performed by the selector module.

9. A method implemented in a computing device, the method comprising:
   providing, by at least one physical unclonable function (PUF), at least one value;
   providing a value from a monotonic counter;
   generating, based on a message authentication code (MAC), a first output, wherein the MAC uses the at least one value provided by the at least one PUF as an input, and the value from the monotonic counter as an additional input, for generating the first output;
   generating a session key based on the first output; and
   after generating the session key, incrementing the monotonic counter.

10. The method of claim 9, wherein the computing device is a first computing device, and the method further comprising transmitting the first output to a second computing device, wherein the first output is a unique identifier of the first computing device.

11. The method of claim 9, wherein providing the at least one value comprises selecting a first value from a first PUF and selecting a second value from a second PUF.

12. The method of claim 9, further comprising:
    testing repeatability of a first PUF of the at least one PUF; and
    based on determining that the first PUF fails the testing, excluding the first PUF from providing any input to the MAC when generating the first output.

13. The method of claim 12, wherein the testing comprises comparing two or more values provided by the first PUF.

14. The method of claim 9, wherein the computing device is a memory device, and the memory device comprises a non-volatile storage media configured to store an output value generated using the MAC.

15. The method of claim 9, further comprising performing, by at least one processor, at least one cryptographic function, wherein performing the at least one cryptographic function comprises using an output value generated using the MAC.

16. A non-transitory computer storage medium storing instructions which, when executed on a memory device, cause the memory device to perform a method, the method comprising:
    providing, by at least one physical unclonable function (PUF), at least one value;

generating, based on a message authentication code (MAC), a first output, wherein the MAC uses the at least one value provided by the at least one PUF as a first input, and uses a value from a monotonic counter as a second input, for generating the first output; and
generating a session key based on the first output.

* * * * *